(12) United States Patent
Kifune

(10) Patent No.: US 11,189,861 B2
(45) Date of Patent: Nov. 30, 2021

(54) SECONDARY BATTERY AND MANUFACTURING METHOD THEREOF

(71) Applicant: VEHICLE ENERGY JAPAN INC., Hitachinaka (JP)

(72) Inventor: Motonari Kifune, Hitachinaka (JP)

(73) Assignee: VEHICLE ENERGY JAPAN INC., Hitachinaka (JP)

( * ) Notice: Subject to any disclaimer, the term of this patent is extended or adjusted under 35 U.S.C. 154(b) by 0 days.

(21) Appl. No.: 15/778,332

(22) PCT Filed: Jan. 18, 2017

(86) PCT No.: PCT/JP2017/001594
§ 371 (c)(1),
(2) Date: May 23, 2018

(87) PCT Pub. No.: WO2017/130821
PCT Pub. Date: Aug. 3, 2017

(65) Prior Publication Data
US 2018/0351211 A1    Dec. 6, 2018

(30) Foreign Application Priority Data

Jan. 27, 2016  (JP) .............................. JP2016-013716

(51) Int. Cl.
*H01M 10/0587* (2010.01)
*H01M 50/543* (2021.01)
(Continued)

(52) U.S. Cl.
CPC ......... *H01M 10/0587* (2013.01); *H01M 4/13* (2013.01); *H01M 4/139* (2013.01);
(Continued)

(58) Field of Classification Search
None
See application file for complete search history.

(56) References Cited

U.S. PATENT DOCUMENTS

2004/0121237 A1   6/2004   Kelley et al.
2006/0199294 A1   9/2006   Fujikawa et al.
(Continued)

FOREIGN PATENT DOCUMENTS

CN    100352088 C    11/2007
CN    101730952 A    6/2010
(Continued)

OTHER PUBLICATIONS

Kinugawa et al. (WO 2013/031211 A1, machine translation). (Year: 2013).*

(Continued)

*Primary Examiner* — Brian R Ohara
(74) *Attorney, Agent, or Firm* — Foley & Lardner LLP

(57) ABSTRACT

Disclosed is a secondary battery obtained by rolling a cathode 31 and an anode 32 by interposing separators 33 and 34. The cathode 31 and the anode 32 have metal foils 31a and 32a, mixture layers 31b and 32b formed on the metal foils 31a and 32a, and foil exposure portion 31c and 32c that expose the metal foils 31a and 32a and are provided in one side in the width direction, respectively. The cathode 31 or the anode 32 has an insulation layer 35 that covers the mixture layers 31b and 32b, and a tip of a taper portion 32t of the mixture layer 32b, where the taper portion 32t is adjacent to the foil exposure portions 31c and 32c and has a thickness gradually reduced toward the foil exposure portions 31c and 32c, is exposed from the insulation layer 35.

13 Claims, 11 Drawing Sheets

(51) Int. Cl.
*H01M 50/463* (2021.01)
*H01M 50/46* (2021.01)
*H01M 4/13* (2010.01)
*H01M 4/139* (2010.01)
*H01M 4/36* (2006.01)
*H01M 4/583* (2010.01)
*H01M 4/62* (2006.01)
*H01M 10/04* (2006.01)
*H01M 10/0525* (2010.01)
*H01M 4/02* (2006.01)

(52) U.S. Cl.
CPC ........... *H01M 4/364* (2013.01); *H01M 4/583* (2013.01); *H01M 4/623* (2013.01); *H01M 10/0431* (2013.01); *H01M 10/0525* (2013.01); *H01M 50/46* (2021.01); *H01M 50/463* (2021.01); *H01M 50/543* (2021.01); *H01M 2004/027* (2013.01); *H01M 2004/028* (2013.01)

(56) References Cited

U.S. PATENT DOCUMENTS

| | | | |
|---|---|---|---|
| 2007/0048613 | A1 | 3/2007 | Yanagida et al. |
| 2007/0072083 | A1 | 3/2007 | Ikuta et al. |
| 2010/0112405 | A1 | 5/2010 | Peters et al. |
| 2010/0221607 | A1 | 9/2010 | Hatanaka et al. |
| 2012/0058375 | A1* | 3/2012 | Tanaka ................ H01M 4/366 429/94 |
| 2013/0309566 | A1 | 11/2013 | Umehara |
| 2015/0017523 | A1 | 1/2015 | Hirai et al. |
| 2015/0263347 | A1* | 9/2015 | Imaji .................... H01M 10/05 429/231.8 |
| 2016/0043373 | A1 | 2/2016 | Arishima et al. |

FOREIGN PATENT DOCUMENTS

| | | | |
|---|---|---|---|
| CN | 101752576 A | 6/2010 | |
| CN | 104303344 A | 1/2015 | |
| CN | 105190952 A | 12/2015 | |
| JP | 2005-174792 A | 6/2005 | |
| JP | 2005-235414 A | 9/2005 | |
| JP | 2010-192365 A | 9/2010 | |
| JP | 2012-234822 A | 11/2012 | |
| JP | 5112853 B2 | 1/2013 | |
| JP | 2015-060698 A | 3/2015 | |
| JP | 2015-076196 A | 4/2015 | |
| JP | 2015-082455 A | 4/2015 | |
| WO | WO-2012/101816 A1 | 8/2012 | |
| WO | WO-2013/031211 A1 | 3/2013 | |
| WO | WO-2014162437 A1 * | 10/2014 | .......... H01M 4/0404 |

OTHER PUBLICATIONS

Supplementary European Search Report issued in corresponding European Patent Application No. 17744051.8 dated Jul. 8, 2019.
International Search Report with English translation and Written Opinion issued in corresponding application No. PCT/JP2017/001594 dated Mar. 21, 2017.
Office Action in corresponding Japanese Application No. 2017-564194 drafted Apr. 26, 2019 and dated May 8, 2019, with partial English translation.
Notice of Allowance dated Sep. 15, 2021 in Chinese Application No. 201780003656.0.
He, Jiabing et al., "The Design of Winding Mechanism of the Square Lithium Battery Winding Machine," Equipment for Electronic Products Manufacturing (EPE) pp. 31-33 (Aug. 2011).

* cited by examiner

SECONDARY BATTERY AND MANUFACTURING METHOD THEREOF

TECHNICAL FIELD

The present invention relates to a secondary battery and a manufacturing method thereof.

BACKGROUND ART

In the related art, there is known a lithium ion secondary battery which includes a cathode having a cathode active material and a core bearing the cathode active material, an anode having an anode active material and a core bearing the anode active material, and an electrolytic solution containing a nonaqueous solvent (see PTL 1 listed below).

In PTL 1, it is stated that a porous insulation layer containing an inorganic filler and a resin binder is born in an electrode active material layer in order to suppress a separator, which is a microporous resin film for electrically insulating the cathode and the anode, from being shrunken by heat generated in the event of an internal short circuit and expanding a short-circuited portion.

CITATION LIST

Patent Literature

PTL 1: JP 5112853 B2

SUMMARY OF INVENTION

Technical Problem

Using the lithium ion secondary battery discussed in PTL 1, it is possible to obtain an effect of suppressing expansion of the short-circuited portion caused by the porous insulation layer in the event of an internal short circuit. However, the electrode active material layer is covered by a generally white opaque porous insulation layer. For this reason, in a process of laminating and rolling the cathode and the anode, it is difficult to specify an end position of the electrode active material layer and, therefore, precision of positioning the cathode active material layer and the anode active material layer may be degraded disadvantageously.

In view of the aforementioned problems, an object of the present invention is to improve positioning precision between a cathode mixture layer and an anode mixture layer in a secondary battery having an insulation layer on a cathode or anode mixture layer.

Solution to Problem

To achieve the object, a secondary battery of the present invention is obtained by rolling a cathode and an anode by interposing a separator, each of the cathode and the anode having a metal foil, a mixture layer formed on the metal foil, and having a foil exposure portion that exposes the metal foil and is provided in one side in a width direction, wherein the cathode or the anode has an insulation layer that covers the mixture layer, and a tip of a taper portion of the mixture layer is exposed from the insulation layer, the taper portion adjacent to the foil exposure portion and having a thickness gradually reduced toward the foil exposure portion.

Advantageous Effects of Invention

According to the present invention, it is possible to improve the positioning precision between the cathode mixture layer and the anode mixture layer in the secondary battery having the insulation layer on the cathode or anode mixture layer.

DESCRIPTION OF EMBODIMENTS

A secondary battery and a manufacturing method thereof according to an embodiment of the present invention will now be described with reference to the accompanying drawings.

First Embodiment

Figure 1:
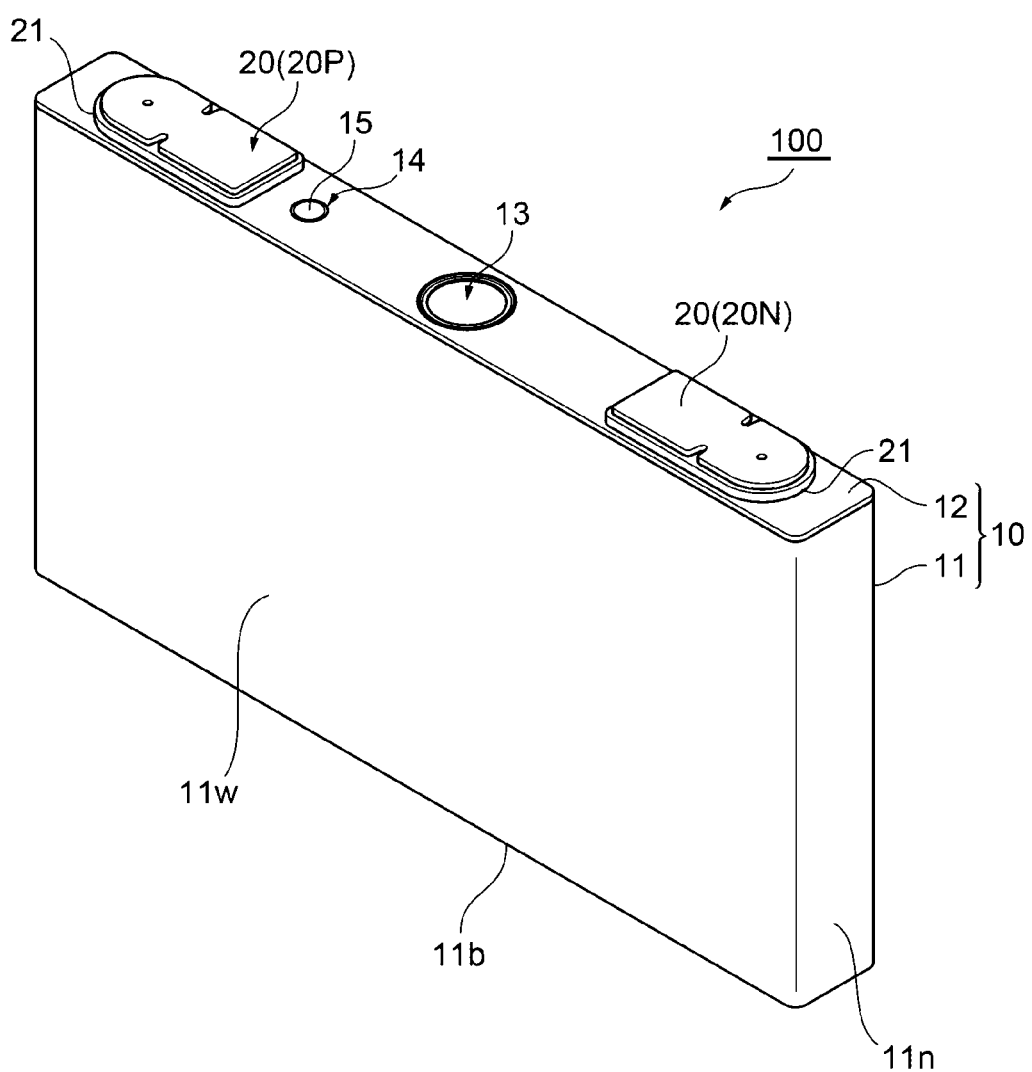
FIG. 1 is an exterior perspective view illustrating a secondary battery according to a first embodiment of the present invention.
Figure 2:
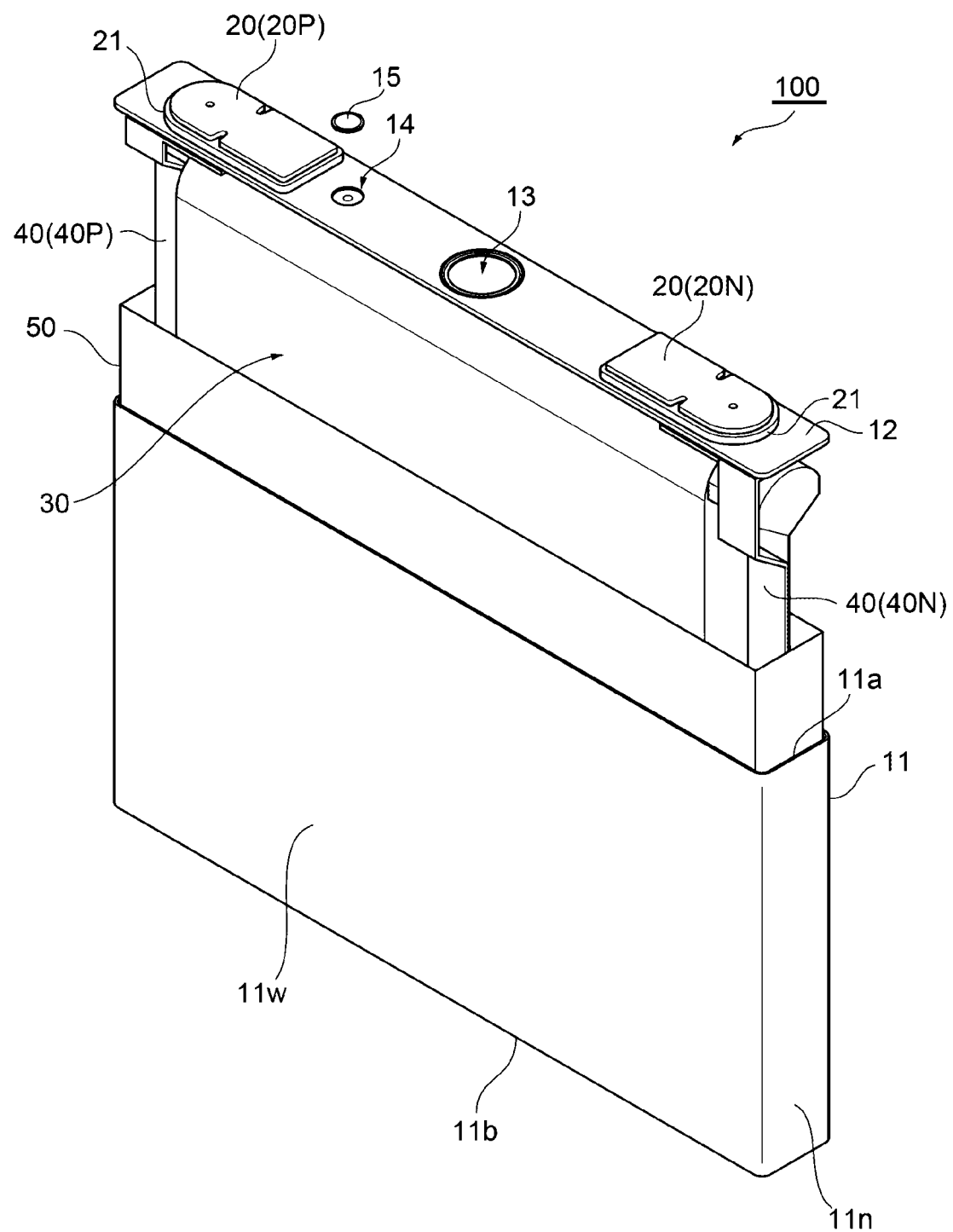
FIG. 2 is an exploded perspective view illustrating the secondary battery of FIG. 1.

FIG. 1 is an exterior perspective view illustrating a secondary battery 100 according to a first embodiment of the present invention. FIG. 2 is an exploded perspective view illustrating the secondary battery 100 of FIG. 1.

The secondary battery 100 according to the first embodiment is a lithium ion secondary battery used as, for example, a vehicle-mounted battery or the like. The secondary battery 100 includes a flat square battery cell 10, an external terminal 20 disposed outside the battery cell 10, an electrode assembly 30 housed inside the battery cell 10, and a charge collector plate 40 that connects each of a cathode 31 and an anode 32 (refer to FIG. 3) included in the electrode assembly 30 to the external terminal 20. The secondary battery 100 according to the first embodiment, which is described below in details, is characterized by a positional relationship between a mixture layer 32b of the anode 32 and an insulation layer 35 that covers the mixture layer 32b included in the electrode assembly 30 (refer to FIG. 4).

The battery cell 10 has a battery can 11 having a bottomed square tubular shape having an opening 11a on its top, and a rectangular plate-shaped battery lid 12 that covers the opening 11a of the battery can 11. The battery can 11 and the battery lid 12 are formed of, for example, metal such as aluminum or aluminum alloy. The battery can 11 is formed in a rectangular box shape by, for example, applying deep drawing to a plate material. The battery can 11 includes a rectangular flat plate-shaped bottom surface 11b opposite to the battery lid 12, a wide-side surface 11w having a relatively wide area along a longitudinal direction of the bottom surface 11b, and a narrow side surface 11n having a relatively narrow area along a transverse direction of the bottom surface.

The battery lid 12 is formed in a rectangular flat plate shape by, for example, pressing a plate member, closes the opening 11a on top of the battery can 11, and is bonded to the opening 11a of the battery can 11, for example, by laser welding, to seal the opening 11a of the battery can 11. On the battery lid 12, a pair of external terminals 20 is disposed, where each of the pair is in either end of the longitudinal direction of the outer surface, and a gas discharge valve 13 and a liquid injection port 14 are provided between the pair of the external terminals 20.

One of the pair of the external terminals 20 is a cathode external terminal 20P, and the other is an anode external terminal 20N. Each of the external terminals 20 is disposed on the battery lid 12 by interposing an insulation member 21 and is electrically insulated from the battery lid 12. Although not illustrated in the drawings, the external terminals 20 are connected to the charge collector plate 40 inside the battery cell 10 through a connection terminal that penetrates the battery lid 12.

The gas discharge valve 13 is formed by thinning the battery lid 12, for example, through pressing. When the internal pressure of the battery cell 10 exceeds a predetermined level due to an abnormality of the secondary battery 100, the gas discharge valve 13 is opened to discharge an internal gas or the like of the battery cell 10 and reduce an internal pressure of the battery cell 10. Alternatively, the gas discharge valve 13 may be manufactured, for example, by forming a through-hole in the battery lid 12 and bonding a film member to the through-hole by laser welding.

The liquid injection port 14 is a through-hole provided in the battery lid 12 and is used to inject an electrolytic solution into the battery cell 10, after the electrode assembly 30 and the charge collector plate 40 are housed in the battery can 11 through the opening 11a of the battery can 11 and after the battery lid 12 is bonded to the opening 11a of the battery can 11. The liquid injection port 14 is closed by a liquid injection plug 15 and is sealed by bonding the liquid injection plug 15, for example, by laser welding. As the electrolytic solution, for example, a nonaqueous electrolytic solution obtained by dissolving a lithium salt, such as lithium hexafluorophosphate ($LiPF_6$), in a carbonate ester-based organic solvent such as ethylene carbonate may be employed.

Figure 3:
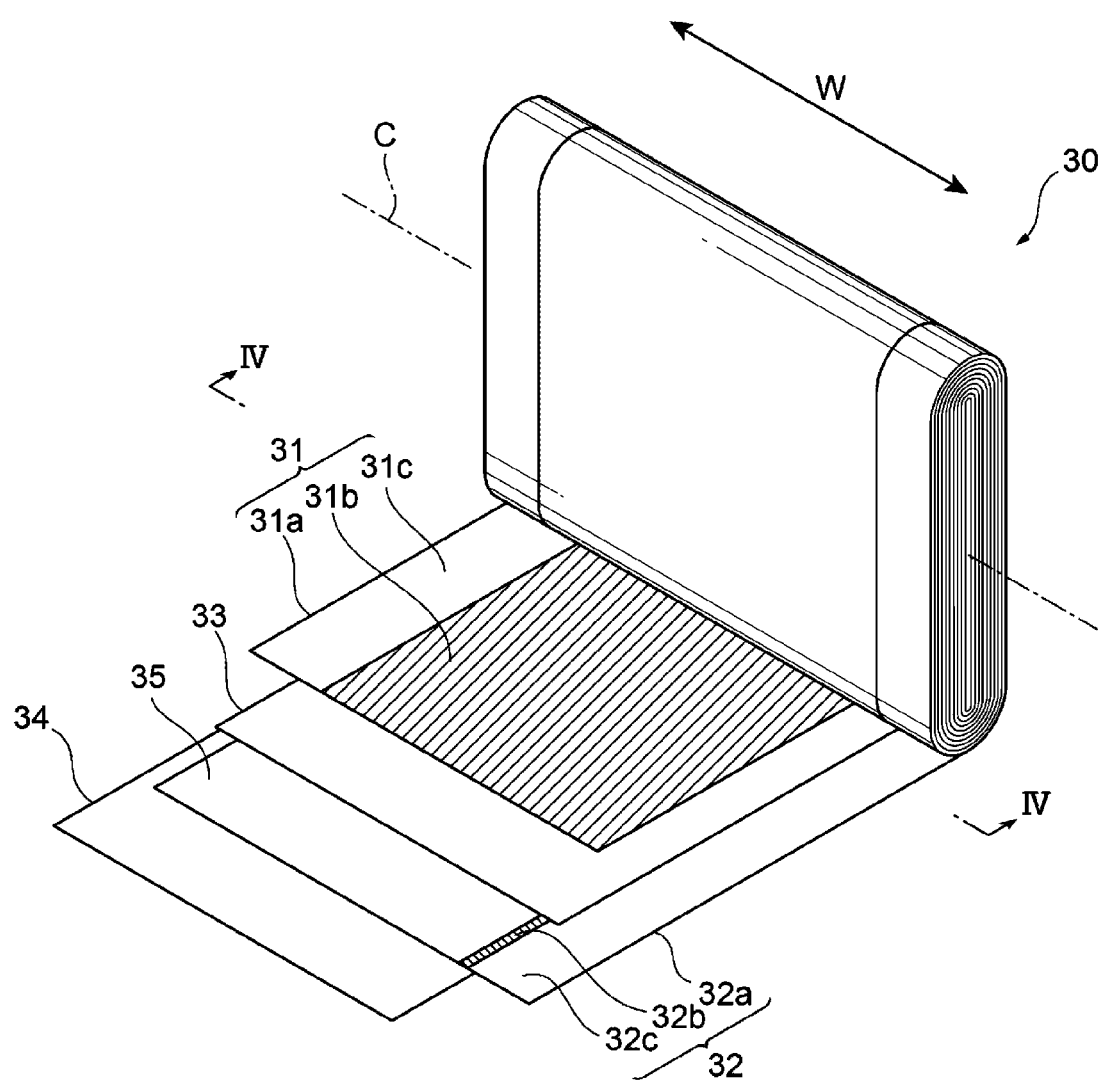
FIG. 3 is an exploded perspective view illustrating an electrode assembly of the secondary battery of FIG. 2.

FIG. 3 is a schematic exploded perspective view illustrating the electrode assembly 30 of FIG. 2.

The electrode assembly 30 is an electric generation element of the secondary battery 100 and is a rolled-type electrode assembly obtained by rolling a band-shaped cathode 31, a band-shaped anode 32, and band-shaped separators 33 and 34 interposed between the cathode 31 and the anode 32. A center axis C of the electrode assembly 30 is in parallel with a width direction W of the cathode 31 and the anode 32. The cathode 31 and the anode 32 have metal foils 31a and 32a, mixture layers 31b and 32b formed on the metal foils 31a and 32a, and foil exposure portions 31c and 32c that expose the metal foils 31a and 32a and are provided in one side in the width direction, respectively.

More specifically, the cathode 31 has a cathode metal foil 31a serving as a cathode charge collector and cathode mixture layers 31b formed on front and back surfaces of the cathode metal foil 31a. The cathode 31 has a cathode foil exposure portion 31c in one side in the width direction W, where no cathode mixture layer 31b is formed, and the cathode metal foil 31a is exposed. The cathode metal foil 31a is formed of, for example, aluminum or aluminum alloy. The cathode mixture layer 31b contains, for example, lithium manganate, as the cathode active material.

Similarly, the anode 32 has an anode metal foil 32a serving as an anode charge collector and anode mixture layers 32b formed on front and back surfaces of the anode metal foil 32a. The anode 32 has an anode foil exposure portion 32c in one side in the width direction W, where no anode mixture layer 32b is formed, and the anode metal foil 32a is exposed. The anode metal foil 32a is formed of, for example, copper or copper alloy. The anode mixture layer 32b contains, for example, amorphous carbon powder, as the anode active material.

In the secondary battery 100 according to the first embodiment, the anode 32 has an insulation layer 35 that covers the anode mixture layer 32b. The insulation layer 35 is a microporous electrically-insulating layer, for example, formed by binding the inorganic filler with resin.

Figure 4:
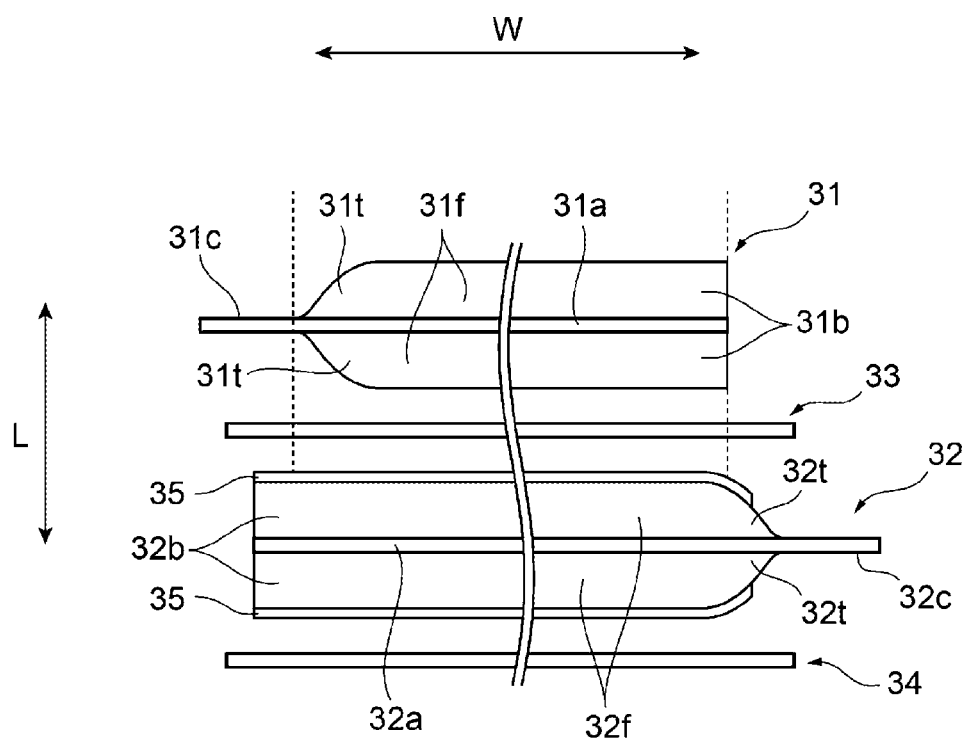
FIG. 4 is a schematic cross-sectional view taken along a line IV-IV of FIG. 3 to illustrate a cathode, an anode, and a separator.

FIG. 4 is a schematic cross-sectional view taken along the line IV-IV of FIG. 3 to illustrate the cathode 31, the anode 32, and the separators 33 and 34.

The cathode 31 and the anode 32 have taper portions 31t and 32t in the mixture layers 31b and 32b, respectively. The taper portions 31t and 32t are end portions in the foil exposure portion 31c and 32c sides of the mixture layers 31b and 32b in the width direction W of the cathode 31 and the anode 32, and are adjacent to the foil exposure portions 31c and 32c, respectively. In the taper portions 31t and 32t, the thicknesses of the mixture layers 31b and 32b are gradually reduced toward the foil exposure portions 31c and 32c, respectively. In addition, the cathode 31 and anode 32 have flat portions 31f and 32f in the mixture layers 31b and 32b, respectively. The flat portions 31f and 32f are parts of the mixture layers 31b and 32b excluding the taper portions 31t and 32t, respectively. In the flat portions 31f and 32f, the thicknesses of the mixture layers 31b and 32b are substantially uniform.

The secondary battery 100 according to the first embodiment is characterized in that the anode 32 has the insulation layer 35 that covers the anode mixture layer 32b, and the taper portion 32t of the anode mixture layer 32b has a tip exposed from the insulation layer 35. Here, the tip of the taper portion 32t is an end portion of the foil exposure portion 32c side of the taper portion 32t in the width direction W of the cathode 31 and the anode 32. That is, the insulation layer 35 can entirely cover the anode mixture layer 32b excluding the tip of the taper portion 32t.

In the secondary battery 100 according to the first embodiment, the cathode 31 has cathode mixture layers 31b in front and back surfaces of the cathode metal foil 31a. In addition, the anode 32 has the anode mixture layers 32b and the insulation layers 35 in front and back surfaces of the anode metal foil 32a, and the taper portion 32t of the anode mixture layer 32b has a tip exposed from the insulation layers 35 on front and back surfaces of the anode metal foil 32a.

Note that the cathode mixture layer 31b may be provided within a range facing the insulation layer 35 of the anode 32 in a laminating direction L of the cathode 31 and the anode 32. In other words, the cathode mixture layer 31b may be formed within a range where the insulation layer 35 is provided in the anode 32 in the width direction W of the cathode 31 and the anode 32. In addition, the cathode mixture layer 31*b* may be placed between both ends of the insulation layer 35 in the width direction W of the cathode 31 and the anode 32. For example, the cathode mixture layer 31*b* may be provided in the inward of both ends of the insulation layer 35 in the width direction W.

In the secondary battery 100 according to the first embodiment, the cathode mixture layer 31*b* faces a part of the taper portion 32*t* of the anode 32 by interposing the insulation layer 35 in the laminating direction L of the cathode 31 and the anode 32. Alternatively, the cathode mixture layer 31*b* may face only the flat portion 32*f* of the anode 32 by interposing the insulation layer 35.

The cathode 31 and the anode 32 are laminated by interposing the separators 33 and 34, and have the cathode foil exposure portion 31*c* disposed in one end of the width direction W and the anode foil exposure portion 32*c* disposed in the other end of the width direction W. In addition, as illustrated in FIG. 3, the cathode 31 and the anode 32 are rolled around the center axis C by interposing the separators 33 and 34, and thus constitute a flat electrode assembly 30. The cathode foil exposure portion 31*c* and the anode foil exposure portion 32*c* are rolled and laminated in one end and the other end of the center axis C direction of the electrode assembly 30, and are pressed and bound in a thickness direction of the flat electrode assembly 30, as illustrated in FIG. 2. The cathode foil exposure portion 31*c* and the anode foil exposure portion 32*c* are bonded to the charge collector plate 40 by, for example, ultrasonic pressure welding.

As a result, the electrode assembly 30 is fixed to the battery lid 12 by interposing the charge collector plate 40, the cathode 31 is connected to the cathode external terminal 20P by interposing the cathode charge collector plate 40P, and the anode 32 is connected to the anode external terminal 20N by interposing the anode charge collector plate 40N. In addition, the electrode assembly 30 fixed to the battery lid 12 by interposing the charge collector plate 40 is covered by a casing-like insulation sheet 50 along with the charge collector plate 40, and is housed in the battery can 11 from the opening 11*a* of the battery can 11 while the electrode assembly 30 is electrically insulated from the battery can 11. The insulation sheet 50 is formed of resin having an insulating property, such as polypropylene.

As illustrated in FIG. 1, the opening 11*a* of the battery can 11 is sealed with the battery lid 12 bonded by, for example, laser welding, to form the battery cell 10. In addition, an electrolytic solution is injected into the inside of the battery cell 10 through the liquid injection port 14 provided in the battery lid 12. The liquid injection port 14 is sealed with the liquid injection plug 15 bonded by, for example, laser welding.

The secondary battery 100 having the aforementioned configuration is used, for example, as a secondary battery module to be mounted to a vehicle, in which a busbar is bonded to the external terminal 20 and a plurality of secondary batteries 100 are connected in series. The secondary battery 100 may store electric energy supplied from a vehicle generator in the electrode assembly 30 or may supply electric energy stored in the electrode assembly 30 to each unit of a vehicle.

A method of manufacturing the secondary battery 100 according to the first embodiment will now be described.

A method of manufacturing the secondary battery 100 according to the first embodiment includes a process of fabricating the cathode 31 and the anode 32, a process of forming the insulation layer 35 on the cathode 31 or the anode 32, and a process of rolling the cathode 31 and the anode 32 by interposing the separators 33 and 34. The manufacturing method known in the art may be employed in other processes of the method of manufacturing the secondary battery 100 according to the first embodiment, and such method will not be described herein.

In the process of fabricating the cathode 31 and the anode 32, first, the mixture layers 31*b* and 32*b* are formed on the metal foils 31*a* and 32*a*, respectively, and the foil exposure portions 31*c* and 32*c* are formed by exposing one side in the width direction W of the metal foils 31*a* and 32*a*, respectively. Note that, although the insulation layer 35 may be formed to cover the mixture layers 31*b* and 32*b* of the cathode 31 or the anode 32, an example of forming the insulation layer 35 that covers the mixture layer 32*b* of the anode 32 will be described in the method of manufacturing the secondary battery 100 according to the first embodiment.

Figure 5:
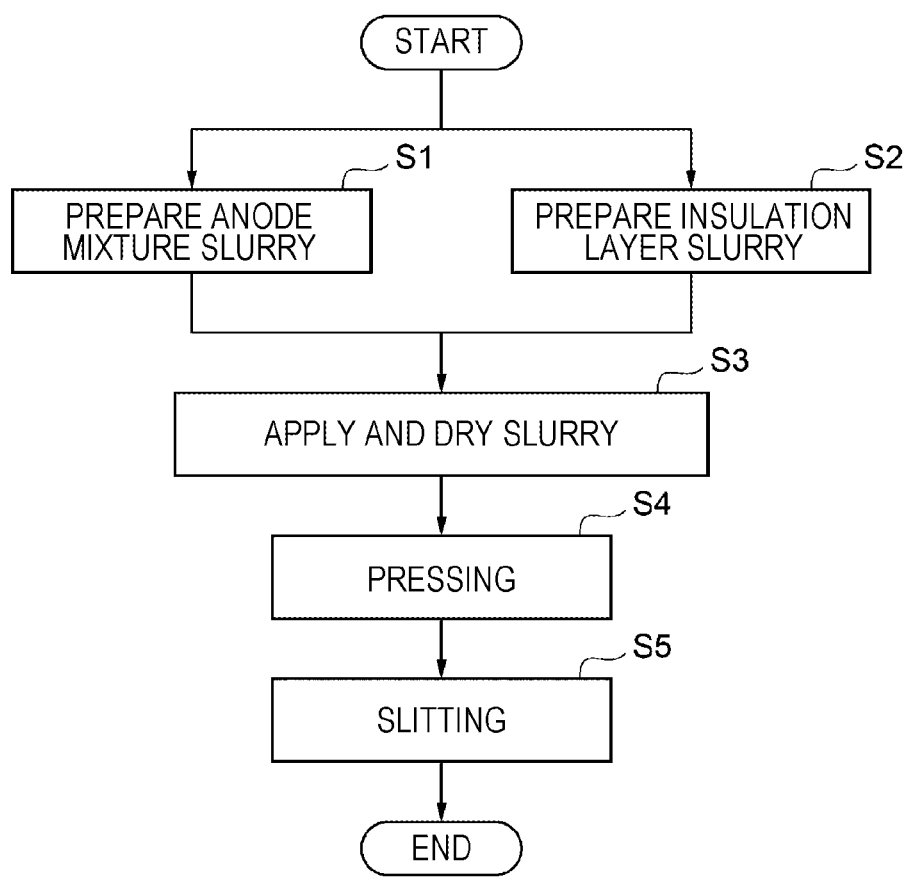
FIG. 5 is a flowchart illustrating an exemplary process of manufacturing the anode and an exemplary process of forming an insulation layer.

FIG. 5 is a flowchart illustrating an exemplary process of fabricating the anode 32 and an exemplary process of forming the insulation layer 35.

In the method of manufacturing the secondary battery 100 according to the first embodiment, the process of forming the anode mixture layer 32*b* and the process of forming the insulation layer 35 are performed simultaneously. As a result, it is possible to improve productivity of the secondary battery 100. Alternatively, the process of forming the anode mixture layer 32*b* and the process of forming the insulation layer 35 may be performed sequentially. The mixture layer 32*b* and the insulation layer 35 of the anode 32 may be formed, for example, in the following sequence.

First, a process S1 of preparing the anode mixture slurry is performed. Specifically, 100 parts by weight of an amorphous carbon powder is prepared as an anode active material, and 10 parts by weight of polyvinylidene fluoride (hereinafter, referred to as PVDF) is added as a binder to the amorphous carbon powder. In addition, N-methylpyrrolidone (hereinafter, referred to as NMP) as a dispersion solvent is added thereto and kneaded to prepare the anode mixture slurry.

Alternatively, without limiting to the amorphous carbon, the anode active material may contain, for example, natural graphite capable of inserting and releasing lithium ions, carbonaceous materials such as artificial various graphite materials or cokes, compounds of Si, Sn, or the like (such as $SiO$, $TiSi_2$), or composite materials thereof. A particle shape of the anode active material may include, but not limited to, for example, scaly, spherical, fibrous, and lumpy shapes.

The process S2 of preparing the insulation layer slurry is performed simultaneously with the process S1 of preparing the anode mixture slurry. Specifically, 100 parts by weight of alumina is prepared as an inorganic filler, and 3 parts by weight of styrene butadiene rubber (hereinafter, referred to as SBR) is added to the alumina as a binder. In addition, ion-exchanged water is added thereto as a dispersion solvent, and the mixture is kneaded to prepare the insulation layer slurry.

Note that, without limiting to the alumina, the inorganic filler which is made of insulating inorganic particles may include fine oxide particles such as silica, zirconia, lithium carbonate, or boehmite. A particle shape of the inorganic filler may include, but not limited to, for example, scaly, spherical, fibrous, and lumpy shapes.

Then, a process S3 of applying and drying the prepared anode mixture slurry and the insulation layer slurry onto the anode metal foil 32*a* is performed.

Figure 6:
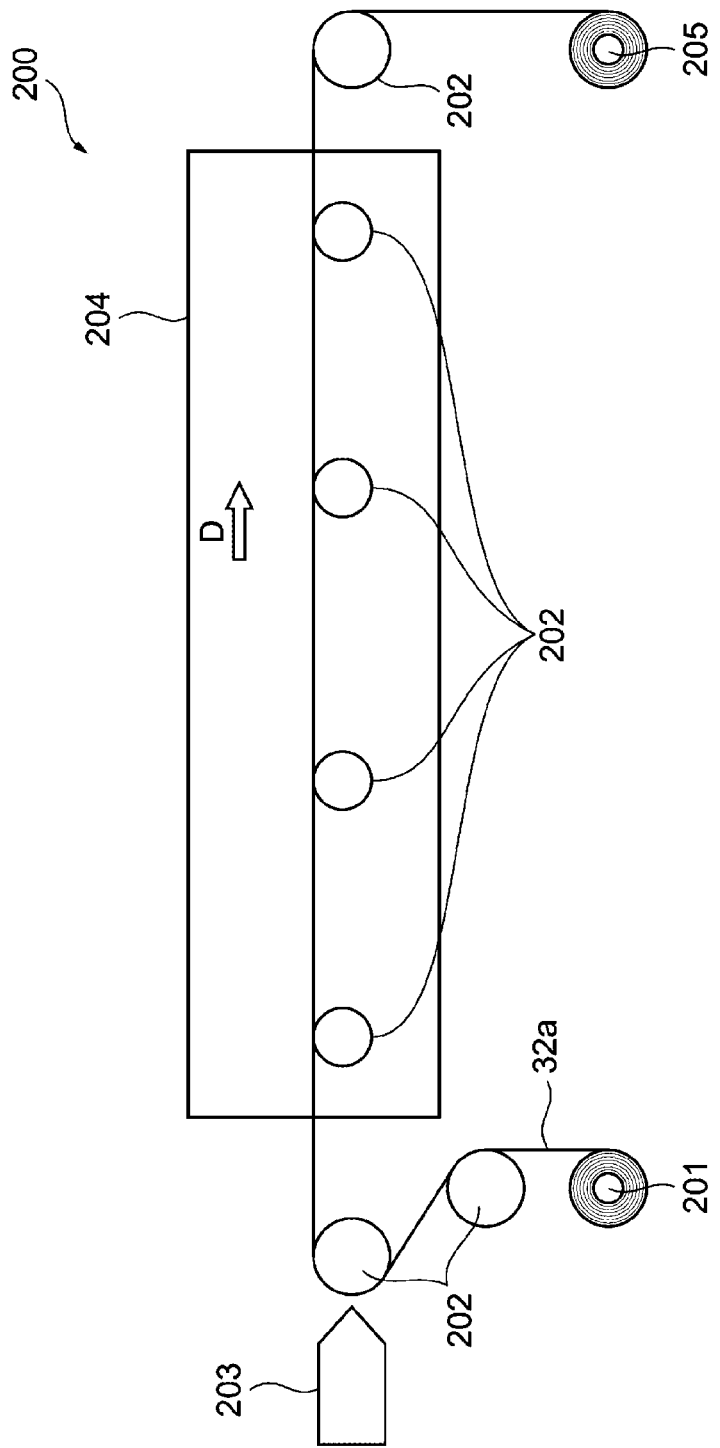
FIG. 6 is a schematic diagram illustrating an application and drying device used in a slurry application and drying process.

FIG. 6 is a schematic diagram illustrating an application and drying device 200 used in the process S3 of applying and drying the anode mixture slurry and the insulation layer slurry onto the anode metal foil 32*a*. The application and drying device 200 includes an unwinding roller 201, a feeding roller 202, a die head 203, a drying furnace 204, and a winding roller 205.

The unwinding roller 201 is rotated while supporting a roll of the metal foil 32*a* to unwind and send a band-shaped metal foil 32*a* from the roll. A plurality of feeding rollers 202 are rotated while supporting the metal foil 32*a* unwound from the roll to feed the metal foil 32*a*, such that the metal foil 32*a* passes through the vicinity of the die head 203, is introduced into the drying furnace 204, is output from the drying furnace 204, and is finally conveyed to the winding roller 205. Although not shown in the drawing, the die heads 203 may be disposed to face each of front and back surfaces of the metal foils 32*a*.

Figure 7:
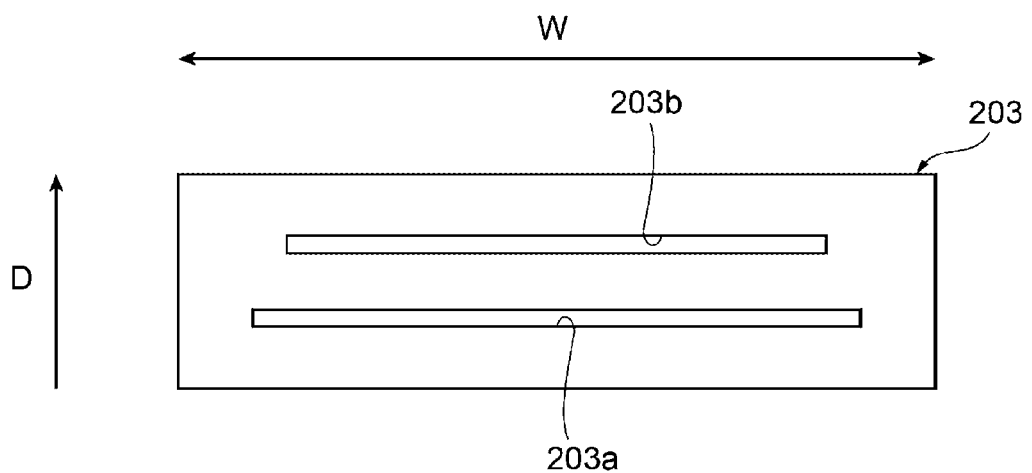
FIG. 7 is a plan view illustrating exemplary slits provided in a die head.

FIG. 7 is a plan view illustrating exemplary slits 203*a* and 203*b* provided in the die head 203.

The die head 203 has, for example, a pair of slits 203*a* and 203*b* extending in the width direction W of the band-shaped metal foil 32*a*, so that the anode mixture slurry is discharged from one of the slits 203*a*, and the insulation layer slurry is sprayed from the other slit 203*b*. Here, the slit 203*a* that sprays the anode mixture slurry may be disposed in the upstream side of the feeding direction D of the metal foil 32*a* relative to the slit 203*b* that sprays the insulation layer slurry. In addition, both ends of the slit 203*b* that discharges the insulation layer slurry is disposed in the inward of both ends of the slit 203*a* that discharges the anode mixture slurry in the width direction W of the band-shaped metal foil 32*a*.

The die heads 203 disposed to face front and back surfaces of the metal foil 32*a* discharge the anode mixture slurry from the slit 203*a* disposed in the upstream side of the feeding direction D of the metal foil 32*a*, and discharge the insulation layer slurry from the slit 203*b* disposed in the downstream side of the feeding direction D of the metal foil 32*a*. As a result, the anode mixture slurry is applied to front and back surfaces of the metal foil 32*a*, and the insulation layer slurry is applied to the anode mixture slurry layer to cover the applied anode mixture slurry layer. The anode slurry layer has a thickness of, for example, approximately 50 to 200 μm. A layer of the insulation slurry layer that covers the anode slurry layer has a thickness of, for example, approximately 5 to 20 μm.

Here, the anode mixture slurry is applied excluding both ends of the width direction W of the metal foil 32*a* corresponding to the foil exposure portion 32*c*. In this case, the anode mixture slurry layer has a taper portion where the thickness is gradually reduced toward the foil exposure portion 32*c* in both ends of the width direction W of the metal foil 32*a* adjacent to the foil exposure portion 32*c*. In addition, the insulation layer slurry layer that covers the applied anode mixture slurry layer is applied to cover the anode mixture slurry layer excluding a tip of the taper portion of the anode mixture slurry layer. Such a positional relationship between the anode mixture slurry layer and the insulation layer slurry layer may be implemented by adjusting an interval between the ends of the slit 203*a* used to spray the anode mixture slurry and the ends of the slit 203*b* used to spray the insulation layer slurry in the width direction W of the metal foil 32*a*.

The drying furnace 204 supplies circulating hot air having a temperature of, for example, approximately 60 to 100° C. to the anode mixture slurry and the insulation layer slurry applied onto the metal foil 32*a* introduced by the feeding roller 202, and dries the anode mixture slurry and the insulation layer slurry by volatilizing solvent components contained therein. As a result, each of the thicknesses of the anode mixture slurry layer and the insulation layer slurry layer on the metal foil 32*a* is reduced to about a half.

Figure 8:
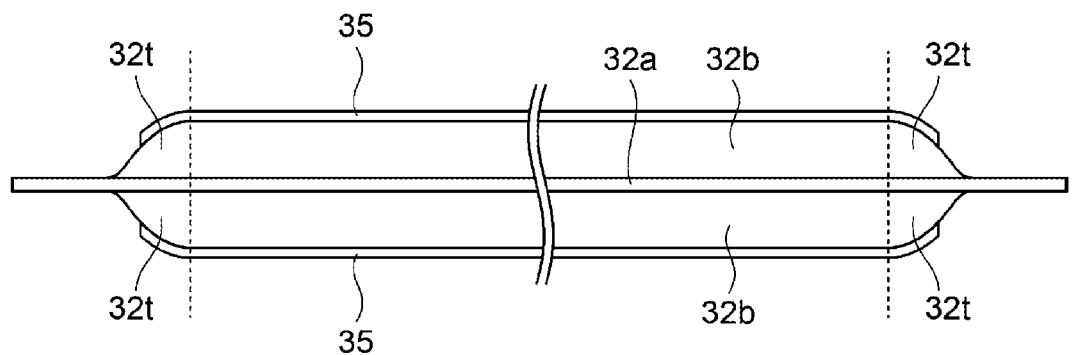
FIG. 8 is a schematic cross-sectional view illustrating the anode after the slurry application and drying process.

FIG. 8 is a schematic cross-sectional view illustrating the anode 32 subjected to the process of applying and drying the anode mixture slurry and the insulation layer slurry on the metal foil 32*a*. Through the aforementioned processes, the mixture layer 32*b* is formed on front and back surfaces of the metal foil 32*a*, and the insulation layer 35 is formed to cover the mixture layer 32*b* excluding the tip of the taper portion 32*t*. Such a positional relationship between the mixture layer 32*b* and the insulation layer 35 may be arbitrarily set, for example, by adjusting a positional relationship between ends of a pair of slits 203*a* and 203*b* of the die head 203 of FIG. 7, that is, a discharge width and position of the anode mixture slurry and a discharge width and position of the insulation layer slurry as described above.

The metal foil 32*a* having front and back surfaces on which the mixture layer 32*b* and the insulation layer 35 are formed is wound in a roll shape using the winding roller 205 as illustrated in FIG. 6. Note that, although the mixture layer 32*b* and the insulation layer 35 are formed on front and back surfaces of the metal foil 32*a* through a single process using a pair of die heads 203 in the manufacturing method according to the first embodiment by way of example, the process of forming the mixture layer 32*b* and the insulation layer 35 is not limited thereto. For example, after the mixture layer 32*b* and the insulation layer 35 are formed on the front surfaces of the metal foil 32*a*, the mixture layer 32*b* and the insulation layer 35 may be formed on the back surfaces of the metal foil 32*a* by winding the metal foil 32*a* using the winding roller 205 and then disposing the roll of the metal foil 32*a* in the unwinding roller 201 again.

After the process S3 of applying and drying the anode mixture slurry and the insulation layer slurry on the metal foil 32*a*, a pressing process S4 and a slitting process S5 are performed as illustrated in FIG. 5.

Figure 9:
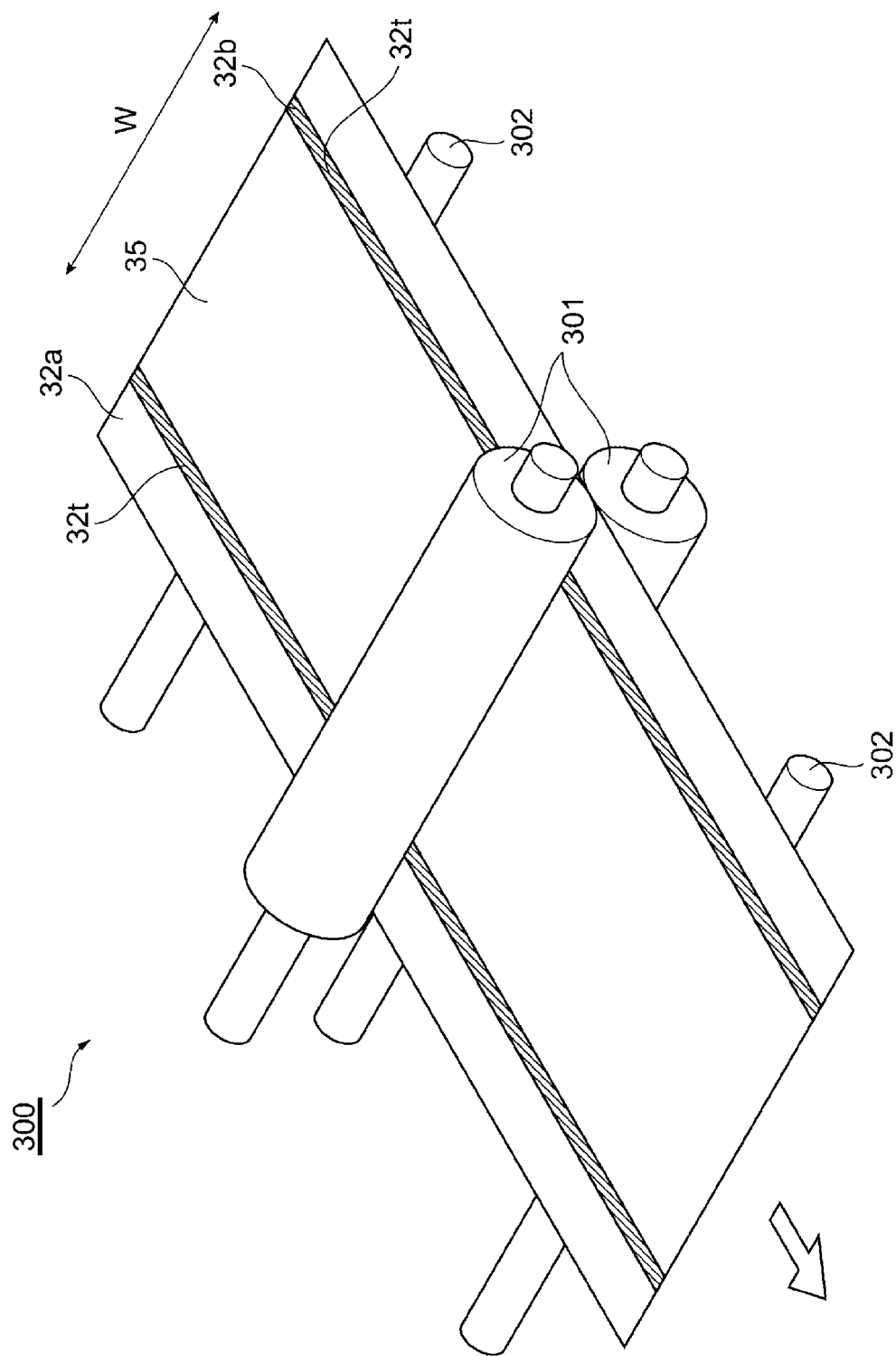
FIG. 9 is a perspective view illustrating a roll press machine used in a pressing process.

FIG. 9 is a schematic perspective view illustrating the roll press machine 300 used in the pressing process S4. The roll press machine 300 has a pair of cylindrical press rollers 301 and feeding rollers 302 to perform pressing by conveying the metal foil 32*a* having the mixture layer 32*b* and the insulation layer 35 formed on front and back sides by the feeding rollers 302, and nipping the metal foil 32*a* between the pair of press rollers 301. In this pressing, the press rollers 301 are heated to a temperature of, for example, 60 to 120° C., so that the mixture layer 32*b* and the insulation layer 35 formed on front and back surfaces of the metal foil 32*a* are heated and pressed by the press rollers 301.

Figure 10:
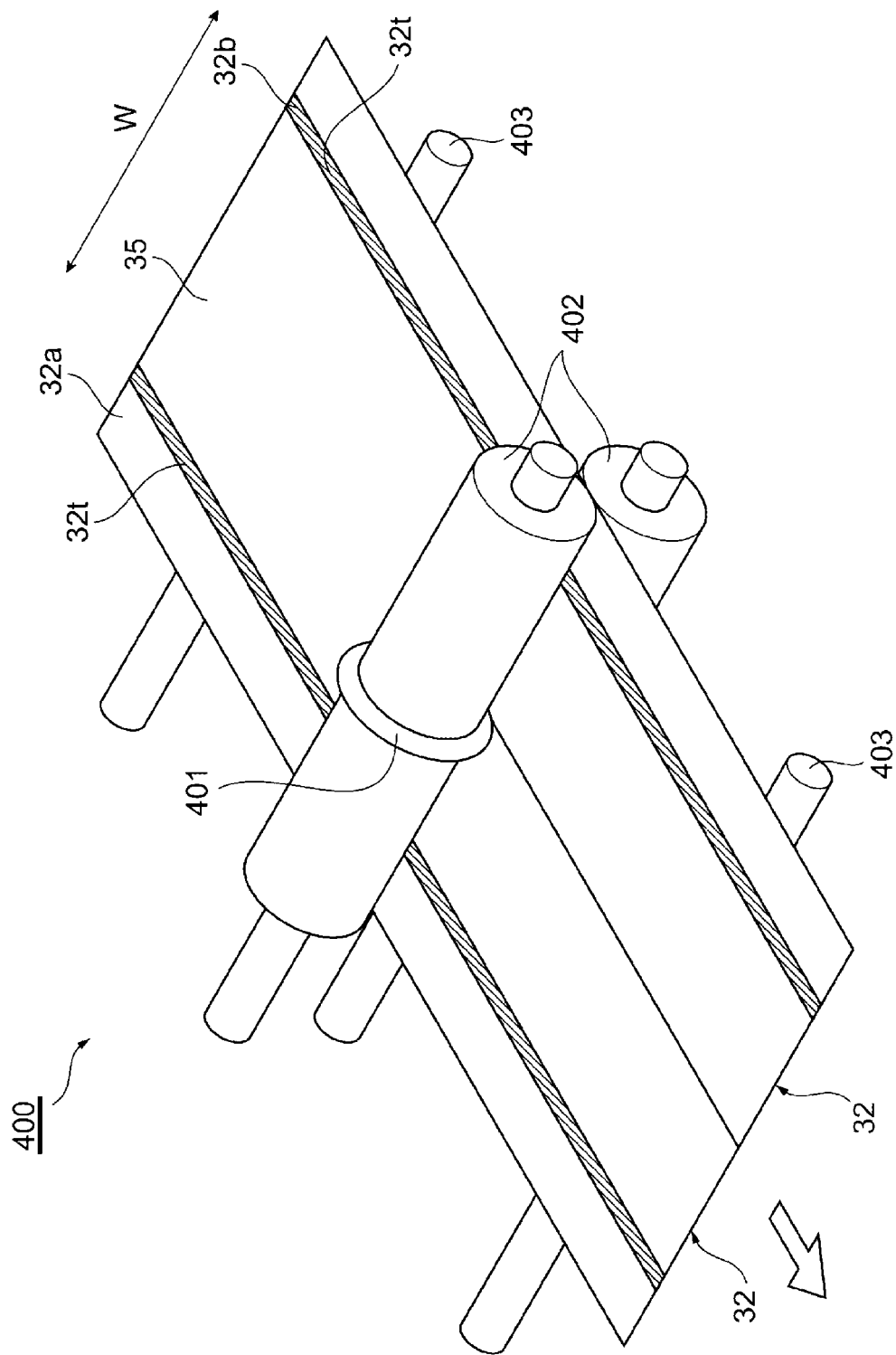
FIG. 10 is a perspective view illustrating a slitting machine used in a slitting process.

FIG. 10 is a schematic perspective view illustrating the slitting machine 400 used in the slitting process S5. The slitting machine 400 has a pair of cylindrical blade rollers 402 having a slit blade 401 and feeding rollers 403 to convey the metal foil 32*a* having the mixture layer 32*b* and the insulation layer 35, after being subjected to the pressing, formed on front and back sides using the feeding rollers 403 and cut the metal foil 32*a* in the center of the width direction W using the slit blades 401 of the blade rollers 402. As a result, a pair of band-shaped anodes 32 are obtained as illustrated in FIGS. 3 and 4. In this manner, in the manufacturing method according to the first embodiment, a pair of anodes 32 are manufactured simultaneously. That is, so-called two-section cutting is performed.

Here, the tips of the taper portions 32*t* in both ends of the mixture layer 32*b* in the width direction W of the metal foil 32a are exposed from the insulation layer 35. For this reason, in the slitting process S5, it is possible to accurately recognize positions of both ends of the mixture layer 32b, and accurately position a cutting position of the slit blade 401 of the blade roller 402 in the center position of the mixture layer 32b in the width direction W of the metal foil 32a. Therefore, it is possible to accurately cut the mixture layer 32b along the center in the width direction W of the metal foil 32a and manufacture the anode 32 having the mixture layer 32b with a uniform width.

In the method of manufacturing the secondary battery 100 according to the first embodiment, the process of fabricating the cathode 31 is similar to the process of fabricating the anode 32 described above except that the process of forming the insulation layer 35 is omitted.

Note that, in the process of preparing the cathode mixture slurry applied on the cathode metal foil 31a, 100 parts by weight of lithium manganate (chemical formula: $LiMn_2O_4$) is prepared as the cathode active material, 10 parts by weight of scaly graphite is added thereto as a conductive material, and 10 parts by weight of PVDF is added as a binder. In addition, the NMP as a dispersion solvent is added thereto, and the mixture is kneaded to prepare cathode mixture slurry.

The cathode active material is not limited to lithium manganate. Alternatively, the cathode active material may include, for example, other lithium manganate having a spinel crystal structure, a lithium manganese composite oxide partially substituted or doped with a metal element, lithium cobalt oxide or lithium titanate having a layered crystal structure, and a lithium-metal composite oxide obtained by substituting or doping a part of them with a metal element.

The binder of the material mixture layers 31b and 32b is not limited to PVDF. Alternatively, for example, the binder may include polytetrafluoroethylene (PTFE), polyethylene, polystyrene, polybutadiene, butyl rubber, nitrile rubber, styrene butadiene rubber, polysulfide rubber, nitrocellulose, cyanoethyl cellulose, various latexes, acrylonitrile, vinyl fluoride, vinylidene fluoride, propylene fluoride, chloroprene fluoride, polymer such as acrylic resin, and mixtures thereof.

Then, similar to the process of fabricating the anode 32 described above, the cathode mixture slurry is applied on front and back surfaces of the cathode metal foil 31a excluding the foil exposure portion 31c, and is then dried. Then, the pressing process S4 and the slitting process S5 are performed, so that the cathode 31 having the cathode mixture layer 31b having a thickness of 100 to 200 μm can be fabricated. As described above, when the process of fabricating the cathode 31 and the anode 32 and the process of forming the insulation layer 35 that covers the mixture layer 32b of the anode 32 are completed, the process of rolling the cathode 31 and the anode 32 by interposing the separators 33 and 34 is performed.

Figure 11:
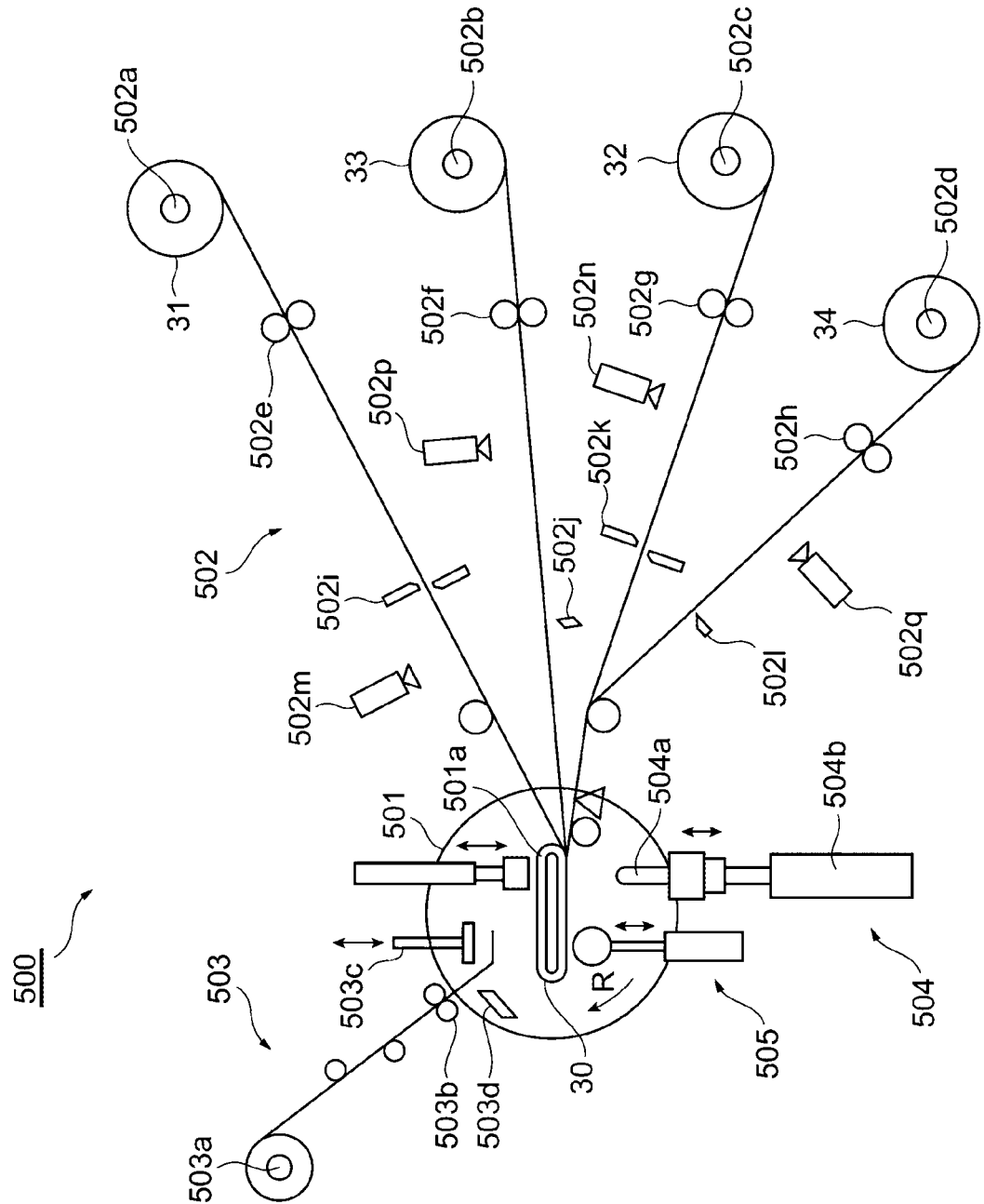
FIG. 11 is a schematic diagram illustrating a rolling device for rolling the electrode assembly of FIG. 3.

FIG. 11 is a schematic diagram illustrating a rolling device 500 for rolling the electrode assembly 30. The rolling device 500 has a spindle 501, a material supply unit 502, a taping unit 503, a thermal bonding unit 504, a temporary holding unit 505, and a controller (not shown).

The spindle 501 is rotatably supported by a center of the device and has a flat plate-shaped core 501a for rolling the long band-shaped material of the electrode assembly 30 supplied from the material supply unit 502, such as the anode 32, the separator 33, the cathode 31, and the separator 34. The spindle 501 and the core 501a may be formed of a metal material such as aluminum alloy or stainless steel.

The material supply unit 502 has support rollers 502a to 502d, feeding rollers 502e to 502h, cutters 502i to 502l, a cathode camera 502m, an anode camera 502n, and separator cameras 502p and 502q.

The support rollers 502a to 502d are rotatably provided to support the long band-shaped materials rolled in a roll-shaped such as the cathode 31, the separator 33, the anode 32, and the separator 34. In addition, each of the support rollers 502a to 502d is provided to move in the axial direction, for example, using a driving device.

The feeding rollers 502e to 502h unwind the ends of each material from the rolls of each material and supply them to the spindle 501. The cutters 502i and 502l cut each material after rolling each material of the electrode assembly 30 using the spindle 501, and then stop supplying each material.

The cathode camera 502m recognizes an end position of the width direction W of the mixture layer 31b formed on the metal foil 31a of the cathode 31 and outputs the positional information to the controller. The anode camera 502n recognizes a tip position of the taper portion 32t which is an end of the width direction W of the mixture layer 32b exposed from the insulation layer 35 that covers the mixture layer 32b formed on the metal foil 32a of the anode 32, and outputs the positional information to the controller.

Each of the separator cameras 502p and 502q recognizes end positions of the width direction W of the separators 33 and 34 and outputs the positional information to the controller. The controller drives the driving device for the support rollers 502a to 502d on the basis of the positional information from the cathode camera 502m, the anode camera 502n, and the separator cameras 502p and 502q to control the laminated positions of the cathode 31, the separator 33, the anode 32, and the separator 34.

The taping unit 503 has a tape support portion 503a, a tape supply portion 503b, a tape pressing portion 503c, and a tape cutter 503d. The tape support portion 503a rotatably supports the long band-shaped gluing tape rolled in a roll-shape. The tape supply portion 503b continuously feeds an end portion of the gluing tape having a roll shape after winding each material of the electrode assembly 30 using the spindle 501 and stopping supply of each material using the material supply unit 502 to supply a gluing tape for attaching the electrode assembly 30 to the outer circumferential surface.

The tape pressing portion 503c presses and attaches the gluing tape supplied from the tape supply portion 503b to the end portion of the separator 34 rolled around the outermost circumference of the electrode assembly 30. The tape cutter 503d cuts, in a predetermined length, the gluing tape attached to the end portion of the separator 34 by the tape pressing portion 503c. As a result, the end portion of the separator 34 in the outermost circumference of the electrode assembly 30 is fixed to the separator 34 in the outermost circumference of the electrode assembly 30 using the gluing tape, so that releasing of each material of the electrode assembly 30 is prevented.

The thermal bonding unit 504 has a heater head 504a and a heater shift mechanism 504b. The heater shift mechanism 504b shifts the heater head 504a to press the heater head 504a, for example, to the separators 33 and 34 rolled around the core 501a of the spindle 501. The heater head 504a heats the separators 33 and 34 to thermally bond the laminated parts of the separators 33 and 34 rolled around the core 501a. Note that the thermal bonding unit 504 may be substituted with the taping unit 503 described above to fix the separators 33 and 34 using the gluing tape.

The temporary holding unit 505 temporarily presses and holds each material of the electrode assembly 30 on the core 501a so as not to be released when each material rolled around the core 501a of the spindle 501 is cut, or the separators 33 and 34 are fixed using the gluing tape or thermal bonding.

Effects of the secondary battery 100 and the manufacturing method thereof according to the first embodiment will now be described.

When the electrode assembly 30 is fabricated using the rolling device 500, first, the separators 34 and 33, the anode 32, and the cathode 31 are sequentially supplied to the core 501a using the material supply unit 502 and are rolled by rotating the spindle 501. In this case, as illustrated in FIGS. 3 and 4, it is necessary to accurately position the cathode mixture layer 31b and the anode mixture layer 32b such that the cathode mixture layer 31b entirely overlaps with the anode mixture layer 32b in the laminating direction L of the cathode 31 and the anode 32.

However, when the anode mixture layer 32b is entirely covered by the opaque insulation layer 35 as in the battery element described in PTL 1, it may be difficult to specify the position of the anode mixture layer 32b in the process of laminating and rolling the cathode 31 and the anode 32. This may degrade positioning precision between the cathode mixture layer 31b and the anode mixture layer 32b. If the positioning precision between the cathode mixture layer 31b and the anode mixture layer 32b is degraded, a problem such as a capacity decrease may occur in the secondary battery 100.

In this regard, the method of manufacturing the secondary battery 100 according to the first embodiment has a process of forming the insulation layer 35 that covers the mixture layer 32b of the anode 32 and exposing the tip of the taper portion 32t of the mixture layer 32b from the insulation layer 35. Here, the paper portion is adjacent to the foil exposure portion 32c and has a thickness gradually reduced toward the foil exposure portion 32c. As a result, in the secondary battery 100 according to the first embodiment, the anode 32 has the insulation layer 35 that covers the mixture layer 32b, and the tip of the taper portion 32t of the mixture layer 32b is exposed from the insulation layer 35.

For this reason, in the process of rolling the cathode 31 and the anode 32 by interposing the separators 33 and 34, for example, the tip of the taper portion 32t of the anode mixture layer 32b can be recognized by the anode camera 502n of FIG. 11, and the end of the cathode mixture layer 31b of the width direction W of the cathode 31 can be recognized by the cathode camera 502m. As a result, it is possible to roll the cathode 31 and the anode 32 by interposing the separators 33 and 34, for example, while the cathode mixture layer 31b and the anode mixture layer 32b are accurately positioned by driving the support rollers 502a and 502c in the axial direction using the controller of the rolling device 500 and the driving device. Therefore, it is possible to improve reliability of the secondary battery 100.

In the application and drying device 200 of FIG. 6, it is possible to accurately position the mixture layers 32b on front and backs surfaces of the metal foil 32a even in a case where, after the mixture layer 32b and the insulation layer 35 are formed on the front surface of the metal foil 32a, the metal foil 32a is wound by the winding roller 205, and then the mixture layer 32b and the insulation layer 35 are formed on the back surface of the metal foil 32a by disposing the roll of the metal foil 32a in the unwinding roller 201 again. Specifically, since the end of the taper portion 32t of the mixture layer 32b formed on the front surface of the metal foil 32a is exposed from the insulation layer 35, it is possible to accurately position the mixture layer 32b of the back surface to match the mixture layer 32b of the front surfaces with respect to the end of the taper portion 32t of the mixture layer 32b of the front surface.

Since a part of the anode mixture layer 32b other than the tip of the taper portion 32t is covered by the insulation layer 35, it is possible to allow the anode mixture layer 32b except for the tip of the taper portion 32t to entirely face the cathode mixture layer 31b. That is, since the cathode mixture layer 31b faces a part of the taper portion 32t of the anode mixture layer 32b in addition to the entire flat portion 32f of the anode mixture layer 32b by interposing the insulation layer 35 in the laminating direction L of the cathode 31 and the anode 32, it is possible to increase a capacity of the secondary battery 100 by increasing a facing area between the anode mixture layer 32b and the cathode mixture layer 31b.

Alternatively, the cathode mixture layer 31b may face only the flat portion 32f of the anode mixture layer 32b by interposing the insulation layer 35. In this case, compared to a case where the cathode mixture layer 31b faces a part of the taper portion 32t of the anode mixture layer 32b by interposing the insulation layer 35, the capacity of the secondary battery 100 is reduced. However, it is possible to further improve safety and reliability of the secondary battery 100. In this manner, the cathode mixture layer 31b is provided within a range facing the insulation layer 35 of the anode 32 in the laminating direction L of the cathode 31 and the anode 32. As a result, it is possible to reliably interpose the insulation layer 35 between the cathode 31 and the anode 32 and improve safety and reliability of the secondary battery 100.

In the secondary battery 100 according to the first embodiment, the anode mixture layer 32b and the insulation layer 35 are formed on front and back surfaces of the anode metal foil 32a, and the tip of the taper portion 32t of the anode mixture layer 32b is exposed from the insulation layer 35 on front and back surfaces of the anode metal foil 32a. As a result, it is possible to recognize the tip of the taper portion 32t of the anode mixture layer 32b on any one of front and back surfaces of the anode 32. In addition, in the secondary battery 100 according to the first embodiment, the anode 32 has the insulation layer 35. As a result, compared to a case where the insulation layer 35 is provided in the cathode 31, it is possible to improve an effect of preventing precipitation of metal and increase a service lifetime of the secondary battery 100.

As described above, in the secondary battery 100 and the manufacturing method thereof according to the first embodiment, the insulation layer 35 is provided on the cathode mixture layer 31b or the anode mixture layer 32b. Therefore, it is possible to improve positioning precision between the cathode mixture layer 31b and the anode mixture layer 32b. Note that the effects of the secondary battery 100 and the manufacturing method thereof according to the first embodiment can be similarly obtained even when the cathode 31 of the secondary battery 100 has the insulation layer 35 that covers the cathode mixture layer 31b, and the tip of the taper portion 31t of the cathode mixture layer 31b is exposed from the insulation layer 35.

Second Embodiment

Figure 12:
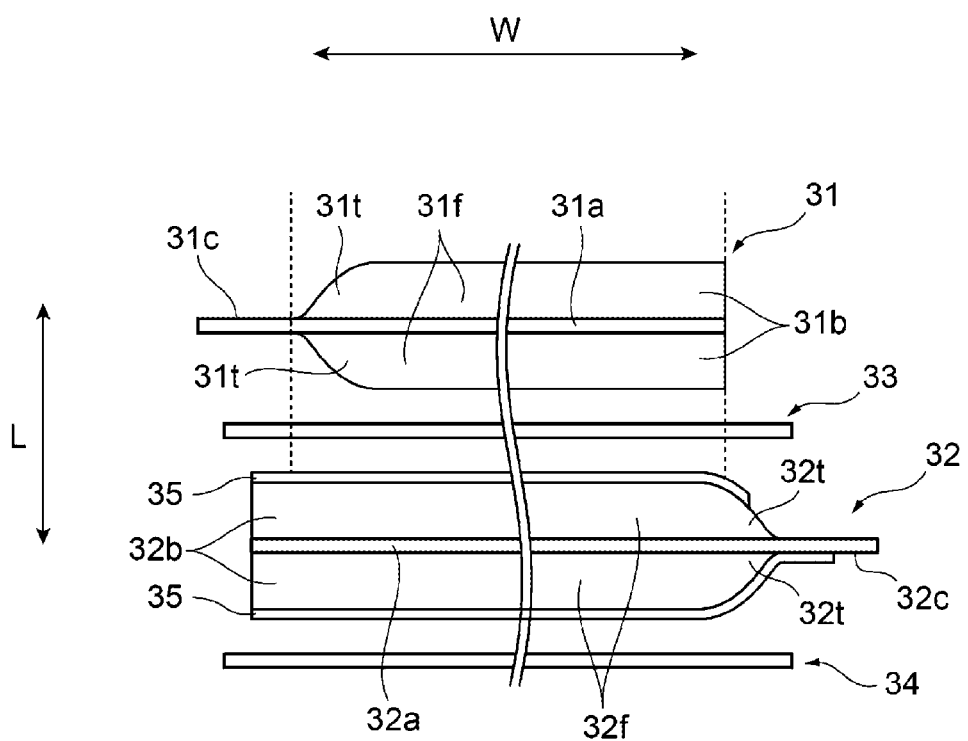
FIG. 12 is a schematic cross-sectional view illustrating a secondary battery according to a second embodiment of the present invention corresponding to FIG. 4.

Next, a secondary battery and a manufacturing method thereof according to a second embodiment of the present invention will be described with reference to FIG. 12 in addition to FIGS. 1 to 3 and 5 to 11. FIG. 12 is a schematic cross-sectional view corresponding to FIG. 4 to illustrate the secondary battery according to the second embodiment of the present invention.

The secondary battery according to the second embodiment is different from that of the first embodiment in that one of the insulation layers 35 on front and back surfaces of the anode 32 entirely covers the anode mixture layer 32b including the taper portion 32t of the anode mixture layer 32b. In addition, the manufacturing method of the secondary battery according to the second embodiment is different from the manufacturing method of the secondary battery 100 of first embodiment described above in that, in the process of forming the insulation layer 35 on the anode 32, the insulation layer 35 that entirely covers the anode mixture layer 32b including the taper portion 32t of the anode mixture layer 32b is formed on one of front and back surfaces of the anode 32. Other parts of the secondary battery and the manufacturing method thereof according to the second embodiment are similar to those of the secondary battery 100 and the manufacturing method thereof of the first embodiment described above. Therefore, like reference numerals denote like elements, and they will not be described repeatedly.

In the secondary battery according to the second embodiment, the tip of the taper portion 32t of the anode mixture layer 32b is exposed from the insulation layer 35 on any one of front and back surfaces of the anode metal foil 32a. Therefore, it is possible to obtain the same effects of the secondary battery 100 and the manufacturing method thereof of the first embodiment described above, for example, by recognizing the taper portion 32t of the anode mixture layer 32b exposed from the insulation layer 35 using the anode camera 502n.

In the secondary battery according to the second embodiment, one of the insulation layers 35 on front and back surfaces of the anode 32 entirely covers the anode mixture layer 32b including the taper portion 32t of the anode mixture layer 32b. Therefore, it is possible to further improve safety and reliability of the secondary battery. In addition, in the manufacturing method of the secondary battery according to the second embodiment, precise positioning of the anode mixture layer 32b and the insulation layer 35 is not necessary in any one of the front and back surfaces of the anode 32 on which the anode mixture layer 32b is entirely covered by the insulation layer 35. Therefore, it is possible to facilitate fabrication of the anode 32 and improve productivity.

While the embodiments of the present invention have been described with reference to the accompanying drawings hereinbefore, specific configurations are not limited to those of the embodiments described above. Instead, various design changes or modifications may be possible without departing from the spirit and scope of the present invention, and they are also construed as being included in the scope of the present invention.

REFERENCES SIGNS LIST 31 cathode
31a metal foil
31b mixture layer
31c foil exposure portion
31f flat portion
31t taper portion
32 anode
32a metal foil
32b mixture layer
32c foil exposure portion
32f flat portion
32t taper portion
33 separator
34 separator
35 insulation layer
100 secondary battery
L laminating direction

The invention claimed is:

1. A secondary battery obtained by rolling a cathode and an anode by interposing a separator,
   each of the cathode and the anode having a metal foil, a mixture layer formed on the metal foil, a foil exposure portion that exposes the metal foil and is provided in one side in a width direction, a first end of the mixture layer having a taper portion with a tip, and a second end of the mixture layer opposing the first end in the width direction of the mixture layer having a cut surface, wherein
   the cathode or the anode has an insulation layer that covers the mixture layer, the insulation layer extending in the width direction from the second end onto the taper portion such that the tip of the taper portion is exposed from the insulation layer,
   the taper portion is adjacent to the foil exposure portion and has a thickness gradually reduced toward the foil exposure portion,
   the mixture layer and the insulation layer are formed on a front surface and a back surface of the metal foil, the front surface and the back surface opposing one another along a radial direction of the metal foil, and
   the tip of the taper portion is exposed from the insulation layer on the front surface of the metal foil and the back surface of the metal foil.

2. The secondary battery according to claim 1, wherein the anode has the insulation layer.

3. The secondary battery according to claim 2, wherein the mixture layer of the cathode is provided within a range facing the insulation layer in a laminating direction of the cathode and the anode.

4. The secondary battery according to claim 3, wherein the mixture layer of the cathode faces a part of the taper portion of the anode by interposing the insulation layer in the laminating direction.

5. The secondary battery according to claim 3, wherein
   the mixture layer of the anode has a flat portion having a uniform thickness, and
   the mixture layer of the cathode faces the flat portion of the anode by interposing the insulation layer.

6. The secondary battery according to claim 1, wherein the cathode has the insulation layer.

7. A method of manufacturing a secondary battery, the method comprising:
   a process of forming a mixture layer on a front surface and a back surface of a metal foil and forming a foil exposure portion by exposing a first end in a width direction of the metal foil, thereby fabricating a cathode and an anode;
   a process of forming an insulation layer on the front surface and the back surface of the metal foil such that the insulation layer covers the mixture layer of the cathode or the anode exposing a tip of a taper portion of the mixture layer from the insulation layer on the front surface and the back surface of the metal foil, the taper portion adjacent to the foil exposure portion and having a thickness gradually reduced toward the foil exposure portion;

a process of forming a cut surface on the cathode or the anode having the insulation layer such that the cut surface is formed on a second end opposite the taper portion in the width direction; and a process of rolling the cathode and the anode by interposing a separator, wherein the front surface and the back surface of the metal foil oppose one another along a radial direction of the metal foil, and wherein the insulation layer extends in the width direction from the second end onto the taper portion.

8. The secondary battery according to claim 2, wherein the cut surface of one of the anode and the cathode is disposed between ends of the insulation layer on the other of the anode and the cathode in the width direction of the anode and the cathode.

9. The secondary battery according to claim 2, wherein the tip of the taper portion of one of the anode and the cathode is disposed between ends of the insulation layer on the other of the anode and the cathode in the width direction of the anode and the cathode.

10. The method according to claim 7, wherein the process of rolling includes disposing the cut surface of one of the anode and the cathode between ends of the insulation layer on the other of the anode and the cathode in the width direction of the anode and the cathode.

11. The method according to claim 7, wherein the process of rolling includes disposing the tip of the taper portion of one of the anode and the cathode between ends of the insulation layer on the other of the anode and the cathode in the width direction of the anode and the cathode.

12. A secondary battery obtained by rolling a cathode and an anode by interposing a separator, each of the cathode and the anode having a metal foil, a mixture layer formed on the metal foil, and a foil exposure portion that exposes the metal foil and is provided in one side in a width direction, wherein the cathode or the anode has an insulation layer that covers the mixture layer, a tip of a taper portion of the mixture layer is exposed from the insulation layer, the taper portion adjacent to the foil exposure portion and having a thickness gradually reduced toward the foil exposure portion, the mixture layer and the insulation layer are formed on a front surface and a back surface of the metal foil, wherein the front surface and the back surface oppose one another along a radial direction of the metal foil, and the tip of the taper portion is exposed from the insulation layer on the front surface of the metal foil, and the tip of the taper portion is entirely covered by the insulation layer on the back surface of the metal foil.

13. The secondary battery according to claim 12, wherein, on the front surface of the metal foil, the insulation layer extends onto the taper portion in the width direction.

\* \* \* \* \*